(12) United States Patent
Tepperman et al.

(10) Patent No.: US 8,972,259 B2
(45) Date of Patent: Mar. 3, 2015

(54) SYSTEM AND METHOD FOR TEACHING NON-LEXICAL SPEECH EFFECTS

(75) Inventors: Joseph Tepperman, Los Angeles, CA (US); Theban Stanley, Boulder, CO (US); Kadri Hacioglu, Boulder, CO (US)

(73) Assignee: Rosetta Stone, Ltd., Harrisonburg, VA (US)

( * ) Notice: Subject to any disclaimer, the term of this patent is extended or adjusted under 35 U.S.C. 154(b) by 494 days.

(21) Appl. No.: 12/878,402

(22) Filed: Sep. 9, 2010

(65) Prior Publication Data

US 2012/0065977 A1    Mar. 15, 2012

(51) Int. Cl.

| | | |
|---|---|---|
| G10L 15/00 | (2013.01) | |
| G06F 15/00 | (2006.01) | |
| G10L 25/00 | (2013.01) | |
| G10L 15/06 | (2013.01) | |
| G10L 17/00 | (2013.01) | |
| G10L 15/04 | (2013.01) | |
| G10L 21/06 | (2013.01) | |
| G10L 13/08 | (2013.01) | |
| G10L 13/10 | (2013.01) | |
| G10L 15/10 | (2006.01) | |
| G10L 17/08 | (2013.01) | |
| G10L 17/26 | (2013.01) | |
| G10L 25/90 | (2013.01) | |

(52) U.S. Cl.
CPC ............... *G10L 13/08* (2013.01); *G10L 13/10* (2013.01); *G10L 15/10* (2013.01); *G10L 17/08* (2013.01); *G10L 17/26* (2013.01); *G10L 2025/903* (2013.01)
USPC ........... 704/236; 704/200; 704/211; 704/243; 704/246; 704/254; 704/276; 434/185

(58) Field of Classification Search
CPC .......... G09B 19/04; G09B 19/06; G09B 5/04; G09B 5/065
USPC ...................... 704/9; 434/156–186
See application file for complete search history.

(56) References Cited

U.S. PATENT DOCUMENTS

| | | | | |
|---|---|---|---|---|
| 5,915,237 A | * | 6/1999 | Boss et al. | 704/270.1 |
| 6,055,498 A | * | 4/2000 | Neumeyer et al. | 704/246 |
| 6,109,923 A | * | 8/2000 | Rothenberg | 434/185 |
| 6,226,611 B1 | | 5/2001 | Neumeyer et al. | |

(Continued)

FOREIGN PATENT DOCUMENTS

| | | | | |
|---|---|---|---|---|
| WO | WO 2008/033095 | * | 3/2008 | |
| WO | WO 2008033095 A1 | * | 3/2008 | G10L 15/08 |

OTHER PUBLICATIONS

Language Learning & Technology, Jan. 1999, vol. 2 No. 2, pp. 62-76 online (http://llt.msu.edu/vol2num2/article3/):Ezkenazi, Using automatic speech processing for foreign language pronunciation tutoring: some issues and a prototype.*

Hardison, Debra M. "Generalization of computer-assisted prosody training: Quantitative and qualitative findings." Language Learning & Technology 8.1 (2004): 34-52.*

Rickard, K, "A preliminary study of the rhythmic characteristics of Arrernte", In Proceedings of the 11th Australasian international conference on speech science and technology (pp. 346-348).*

Tepperman, Joseph, et al., Office Action for U.S. Appl. No. 12/696,222, dated Aug. 20, 2012, 10 pgs.

(Continued)

*Primary Examiner* — Olujimi Adesanya (57) ABSTRACT

A method and system for teaching non-lexical speech effects includes delexicalizing a first speech segment to provide a first prosodic speech signal and data indicative of the first prosodic speech signal is stored in a computer memory. The first speech segment is audibly played to a language student and the student is prompted to recite the speech segment. The speech uttered by the student in response to the prompt, is recorded.

20 Claims, 9 Drawing Sheets

(56) References Cited

U.S. PATENT DOCUMENTS

| | | | |
|---|---|---|---|
| 6,336,089 | B1 | 1/2002 | Everding |
| 6,358,054 | B1* | 3/2002 | Rothenberg .................. 434/185 |
| 6,358,055 | B1* | 3/2002 | Rothenberg .................. 434/185 |
| 6,397,185 | B1* | 5/2002 | Komissarchik et al. ...... 704/270 |
| 2002/0007722 | A1* | 1/2002 | Aoki et al. ....................... 84/635 |
| 2004/0006461 | A1 | 1/2004 | Gupta et al. |
| 2005/0144010 | A1* | 6/2005 | Peng ............................. 704/277 |
| 2005/0255431 | A1* | 11/2005 | Baker ............................ 434/169 |
| 2005/0282121 | A1* | 12/2005 | Zajur ............................. 434/157 |
| 2006/0011045 | A1* | 1/2006 | Yamashita et al. .............. 84/611 |
| 2006/0057545 | A1 | 3/2006 | Mozer et al. |
| 2007/0009865 | A1* | 1/2007 | Palacios ........................ 434/167 |
| 2007/0015122 | A1* | 1/2007 | Palacios ........................ 434/157 |
| 2007/0061139 | A1 | 3/2007 | Shen et al. |
| 2008/0010068 | A1 | 1/2008 | Seita |
| 2008/0070203 | A1* | 3/2008 | Franzblau ..................... 434/157 |
| 2009/0089062 | A1* | 4/2009 | Lu ................................. 704/270 |
| 2010/0004931 | A1* | 1/2010 | Ma et al. ....................... 704/244 |
| 2011/0191104 | A1 | 8/2011 | Tepperman et al. |
| 2011/0208508 | A1* | 8/2011 | Criddle ............................. 704/9 |
| 2012/0251985 | A1* | 10/2012 | Steels et al. ................... 434/156 |

OTHER PUBLICATIONS

Tepperman, Joseph, et al., Final Office Action for U.S. Appl. No. 12/696,222, dated Jun. 14, 2013, 15 pgs.

Asu & Nolan (2005)Asu, E. L. & Nolan, F. (2005). Estonian rhythm and the Pairwise Variability Index. In Proceedings of Fonetik 2005 (pp. 29-32). Gothenburg.

Grabe & Low (2002)Grabe, E., & Low, E. L. (2002). Durational variability in speech and the rhythm class hypothesis. In N. Warner, & C. Gussenhoven (Eds.), Papers in laboratory phonology 7 (pp. 515-546). Berlin: Mouton de Gruyter.

International Search Report and Written Opinion, dated Apr. 20, 2011 of International Application. No. PCT/US11/25986, filed: Feb. 2011.

Vainia, et al.; "New Method for Delexicalizaton and its Application to Prosodic Tagging for Test-to-Speech Synthesis," Interspeech 2009 Brighton, pp. 1703-1706.

Pannekamp, et al.: "The Brain's Response to Hummed Sentences," (3 pgs.).

Pagel, et al.: "A New Method for Speech Delexicalization, and Its Application to the Perception of French Prosody," (4 pgs.).

"Musical Instrument Digital Interface," (14 pgs.).

* cited by examiner

902
PLAY PROSODIC SIGNALS FOR REFERENCE SPEECH AND NON-NATIVE SPEECH FOR STUDENT

904
PROMPT STUDENT TO IDENTIFY REFERENCE PROSODIC SIGNAL AND NON-NATIVE PROSODIC SIGNAL

906
ASSIGN NATIVENESS SCORES TO SIGNALS

908
STUDENT ILLUSTRATES FEATURES OF SAMPLES

US 8,972,259 B2

SYSTEM AND METHOD FOR TEACHING NON-LEXICAL SPEECH EFFECTS

BACKGROUND OF THE INVENTION

The present invention relates generally to teaching methods and machines and, more particularly concerns a system and method for teaching a language.

Traditional methods for teaching a language, in particular a foreign language, are far from enjoyable for students. Students spend a great deal of time learning rules of grammar and syntax and generally learn by memorizing words in the target language (the language being learned) that are translations of corresponding words in a source language. The only exposure to correct pronunciation might be on a recording or during discussions in a classroom. On such occasions, the student finds himself mentally composing his recitation in his native language and then translating it. The usual result is a halting, stilted recital, replete with grammatical and syntactic errors introduced by the translation process. The foregoing approach generally does not enable the language learner to converse fluently in the target language.

In contrast, upon first learning a language, young children are fully immersed in a natural learning process in which they learn words, grammar and syntax interactively through deductive reasoning, in context, and by emulating others. In time, children develop a flowing communication style, without the need to translate or to be concerned about rules. It would be desirable to be able to emulate this kind of learning process in learning a second language.

Moreover, in addition to vocabulary, grammar, and proper verb conjugation, language learning involves learning and practicing the prosodic characteristics of target languages such as pitch, duration, rhythm, and intensity among others. However, existing language learning systems tend to stress vocabulary and grammar, rather than prosodic characteristics of a student's speech. Accordingly, there is a need in the art for a system and method for language learning that more effectively focuses on acoustic/prosodic language characteristics.

SUMMARY OF THE INVENTION

According to one aspect, the invention is directed to a method, that may include delexicalizing a first speech segment to provide a first prosodic speech signal; storing data indicative of the first prosodic speech signal in a computer memory; audibly playing the first speech segment to a language student; prompting the student to recite the speech segment; and recording audible speech uttered by the student in response to the prompt.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
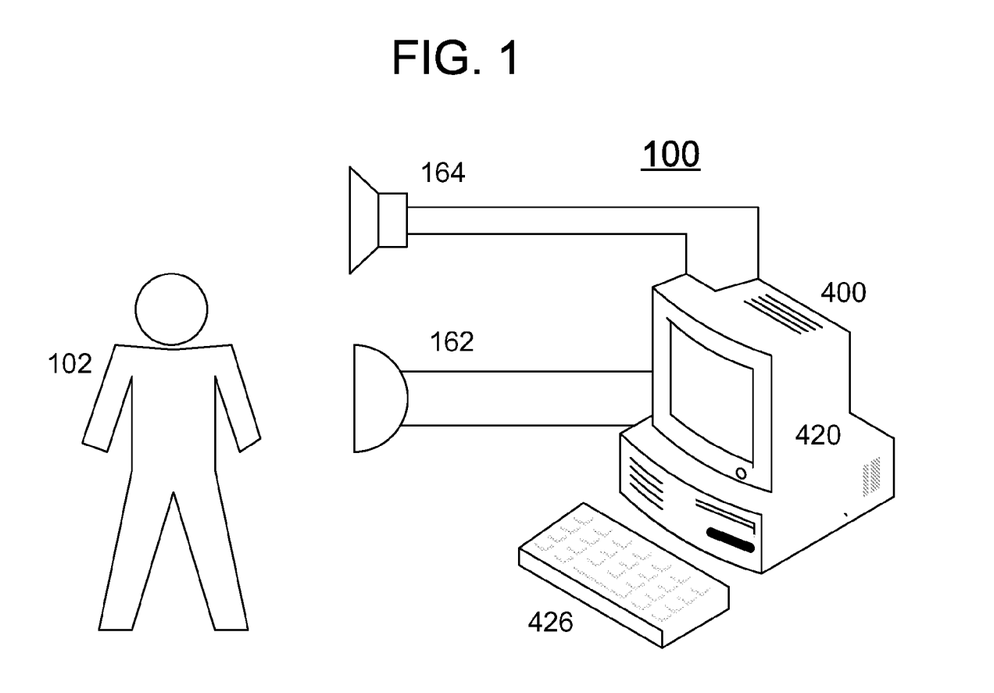
FIG. 1 is a schematic block diagram of a language instruction system including a computer system and audio equipment suitable for practicing an embodiment of the present invention.
Figure 1A:
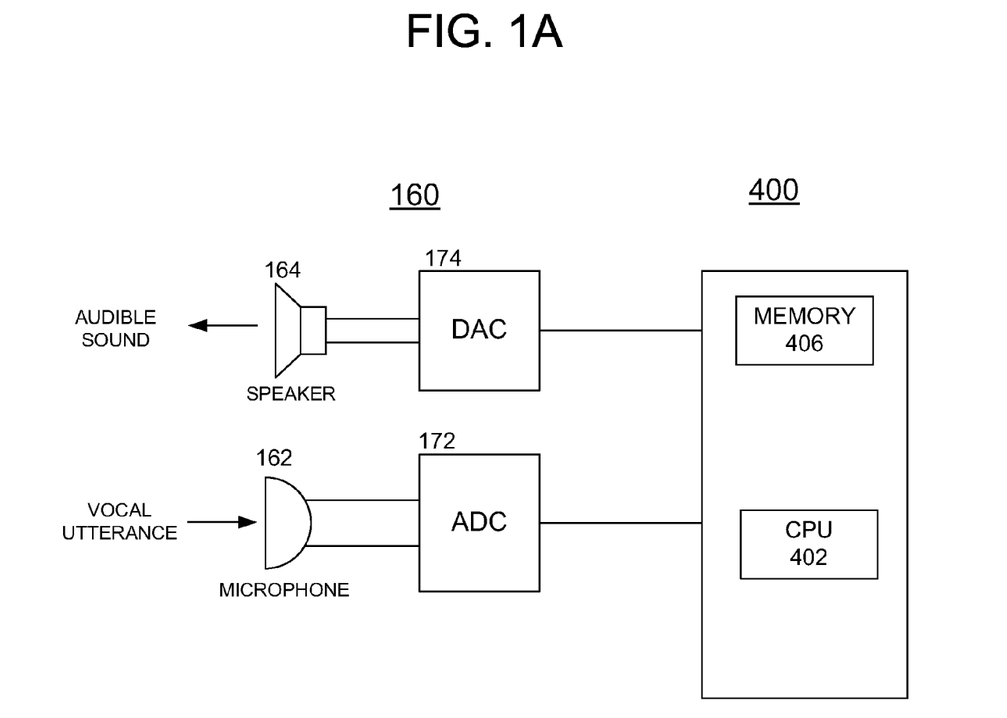
FIG. 1A is a block diagram showing the audio equipment and the computer system of FIG. in greater detail.

FIG. 1 is a schematic block diagram of a language instruction system 100 including a computer system 400 and audio equipment 160 (FIG. 1A) suitable for teaching a target language to student 102 in accordance with an embodiment of the present invention. FIG. 1A shows the audio equipment 160 and computer 400 in greater detail. Reference is made to FIGS. 1 and 1A below.

Language instruction system 100 may interact with one language student 102, or with a plurality of students. Language instruction system 100 may include computer system 400, which may include keyboard 426 (which may have a mouse or other graphical user-input mechanism embedded therein) and/or display 420; and audio system 160 which may include microphone 162, Digital to Analog Converter (DAC) 172, speaker 164, and Analog to Digital Converter (ADC) 174. With reference to FIG. 1A, computer system 400 may further include CPU 402 and memory 406.

The computer 400 and audio equipment 160 shown in FIGS. 1 and 1A are intended to illustrate one way of implementing an embodiment of the present invention. Specifically, computer 400 (which may also referred to as "computer system 400") and audio equipment 160 preferably enable two-way audio-visual communication between the student 102 (which may be a single person) and the computer system 400.

In one embodiment, software for enabling computer system 400 to interact with student 102 may be stored on volatile or non-volatile memory within computer 400. However, in other embodiments, software and/or data for enabling computer 400 may be accessed over a local area network (LAN) and/or a wide area network (WAN), such as the Internet. In some embodiments, a combination of the foregoing approaches may be employed. Moreover, embodiments of the present invention may be implemented using equipment other than that shown in FIG. 1. Computers embodied in various modern devices, both portable and fixed, may be employed including but not limited to Personal Digital Assistants (PDAs), cell phones, among other devices.

Figure 2:
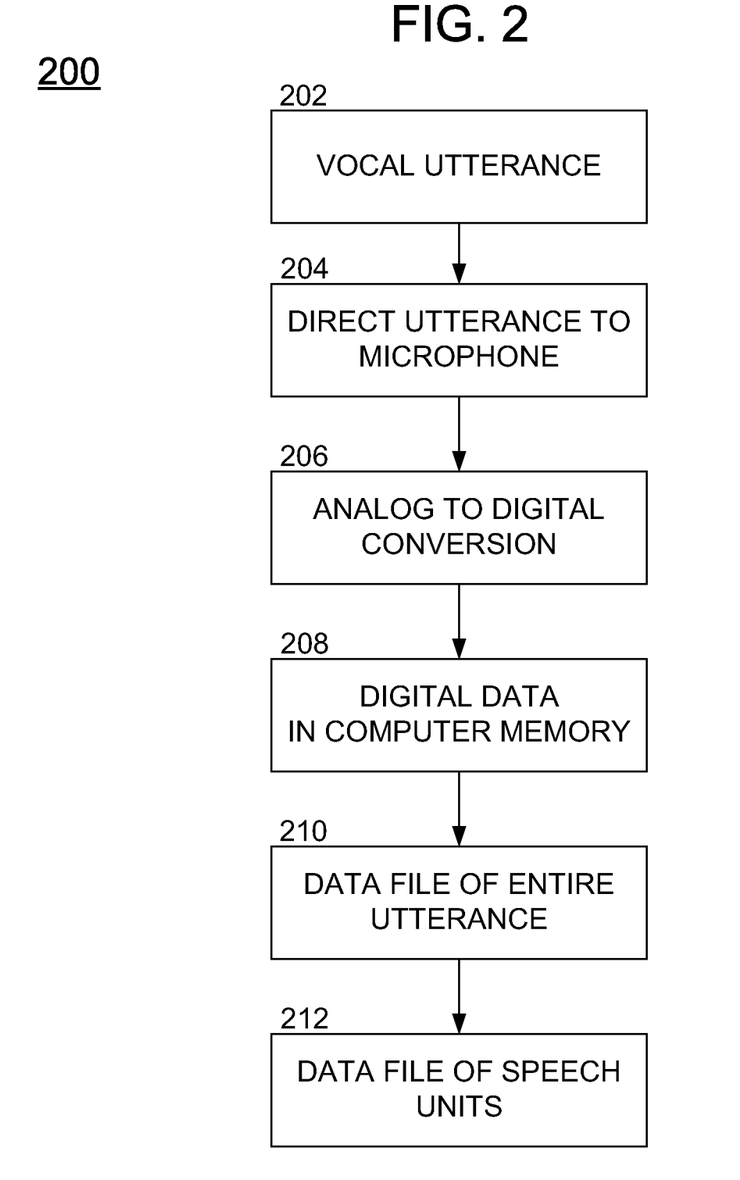
FIG. 2 is a block diagram of a system for generating computer data files representative of audible speech, from a vocal utterance, in accordance with an embodiment of the present invention.

FIG. 2 is a block diagram of a system 200 for generating computer data files representative of audible speech, such as sample utterances by language students and/or by native speakers in accordance with an embodiment of the present invention. FIG. 2 is provided to list and identify the various types of signals and information as well as the audio and data processing equipment that may be employed in accordance an embodiment of the present invention.

At block 202, a speaker, who may be a language learner (i.e. a student), a native speaker providing a sample reading of a block of text, or an instructor, provides a vocal utterance. The vocal utterance, which is preferably spoken at a normal conversational volume level is preferably directed 204 to a microphone 162. The microphone 162 preferably converts the audible sound of the utterance (also referred to herein as a speech sample) into an analog electrical signal representative of the audible utterance. The analog signal is preferably transmitted from microphone 162 to ADC 172 where the analog signal is preferably converted 206 into digital data suitable for storage in a computer memory 406 and manipulation by computer 400. In some embodiments, the microphone 162 and the ADC 172 may be incorporated within a single enclosure for the sake of convenience. In one embodiment ADC 172 may sample the analog data at 16 KHz (Kilohertz) using 16-bit resolution. However, in other embodiments, sampling rates lower than or greater than 16 KHz and may be used. Moreover, resolution higher than or lower than 16-bit resolution may be employed.

At step 208, the digital data obtained at the digital side of ADC 172 is preferably transmitted to a computer memory 406 for temporary and/or long-term storage so that the data is accessible to programs operating within computer 400. The digital data emerging from ADC 172 is preferably accumulated so as to provide a data file 210 representing an entire utterance (speech sample), that may, for example, represent an entire spoken English sentence (or still longer speech segment) in a single data file (or plural data files) that is readily accessible to hardware and/or computer software seeking to access and/or manipulate the digital speech data. Thereafter, the digital speech data within data file 210 may be decomposed into speech units (also referred to herein as "speech segments") accompanied by suitable identifiers of the respective speech units, or otherwise accessed and manipulated to obtain data indicative of characteristics of the speech sample.

Figure 3:
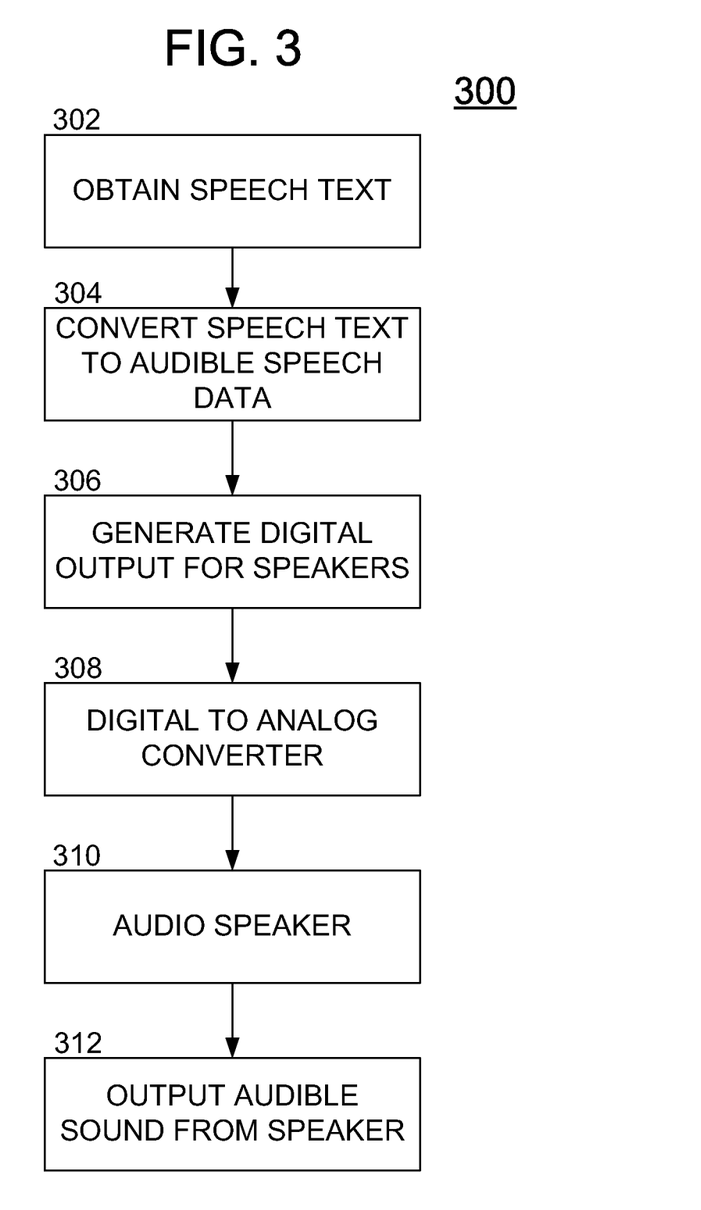
FIG. 3 is a block diagram of a system and method for converting text, which may be encoded in computer-readable form, into audible machine-generated sound using suitable data conversion apparatus and methods in accordance with an embodiment of the present invention.

FIG. 3 is a block diagram of a system and method 300 for converting text into speech using suitable data conversion apparatus and methods in accordance with an embodiment of the present invention. At step 302, a computing system, such as computer system 400, preferably obtains speech text in machine-readable form from memory 406, or other source. At step 304, computer system 400 preferably converts the speech text into audible speech data. At step 306, the data from step 304 may be further processed, as needed, to generate digital data indicative of sounds to be played by audio speaker 164. Thereafter, the data from step 306 may be sent to an Digital to Analog Converter (DAC) 174 to generate signals suitable for physically driving speaker 164 in step 310. At step 312, speaker 164 is caused to play audible baseband sound corresponding to the analog signals arising from step 308.

Figure 4:
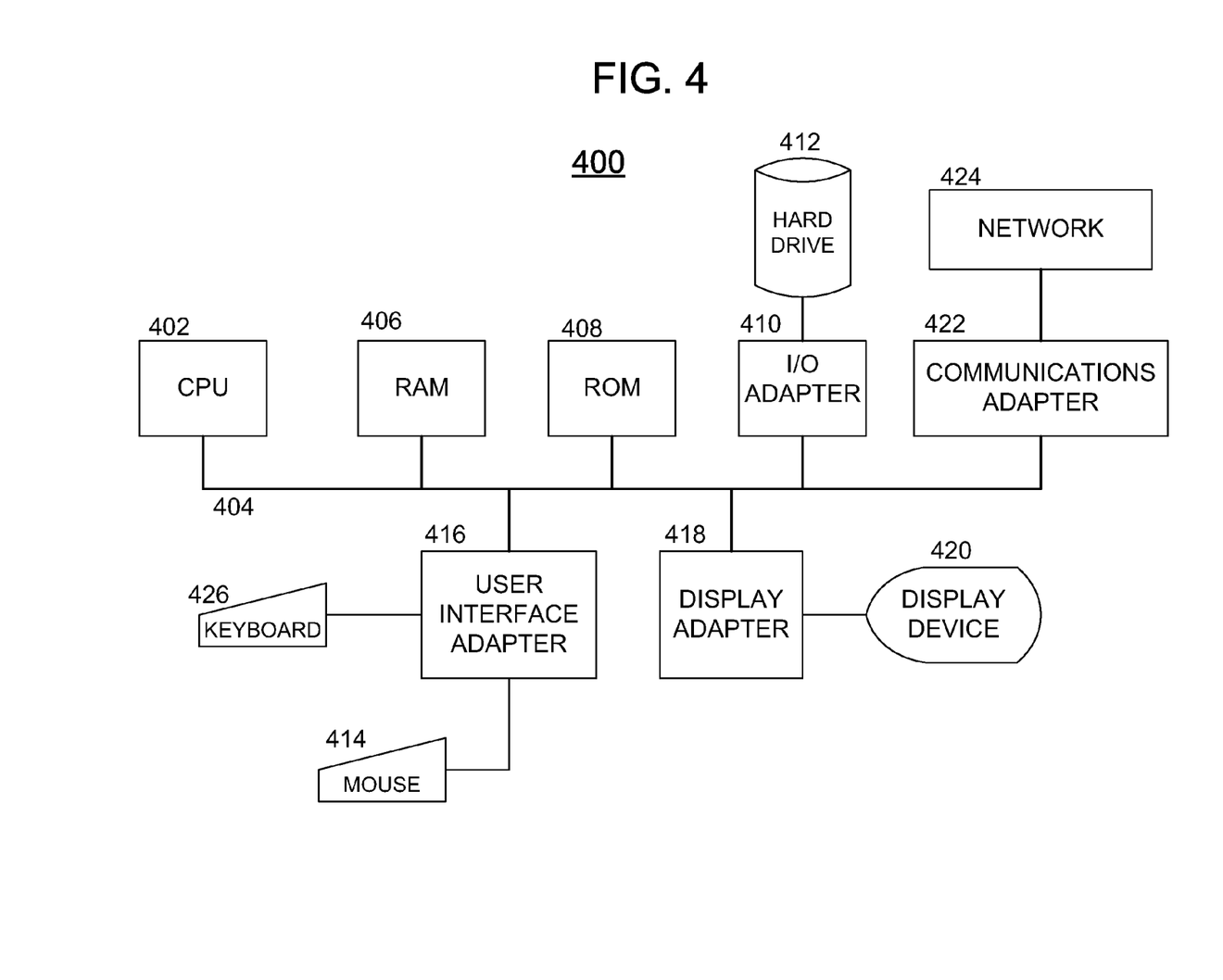
FIG. 4 is a more detailed block diagram of the computer system of FIG. 1.

FIG. 4 is a block diagram of a computing system 400 adaptable for use with one or more embodiments of the present invention. Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs. I/O adapter 410 may connect storage devices, such as hard drive 412, a CD-ROM (not shown), or other mass storage device to computing system 600. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

Having described apparatus and methods for receiving and playing spoken text in a language learning environment 100, we turn now to systems and methods for teaching the prosodic aspects of speech. To establish a frame of reference for the acoustic properties of speech, reference is made herein to a popular media representation of delexicalized speech.

In some one or more popular cartoon programs the speech of adults was played with wordless disapproval, employing a sound reminiscent of a muted trombone. This may serve as a metaphor for child language acquisition. Studies suggest that the suprasegmental aspects of adult speech directed at children play a role in the development of a child's first-language (L1) vocabulary, and that increased experience with hearing a second-language (L2) in early childhood can lead to better native-like realization of that L2's suprasegmental characteristics. Thus, young children learn to parse new L1 words and use L2 suprasegmentals partly by imitating their parents' and teachers' suprasegmental sounds.

Delexicalizing speech, that is, taking the words out of the speech signal is a process used in perceptual studies to examine suprasegmental effects separately from phonetic, lexical, or syntactic information. Delexicalization is also used in speech synthesis for generating prosodic tags from natural speech. It is thus believed that a wordless approach have value in teaching suprasegmental aspects of a foreign language, since students could then focus on rhythm and intonation alone, separately from aspects of language learning involving phonetic pronunciation concerns.

Discussion of Theory

An embodiment herein is an automated method for converting natural speech into a musical signal, to be used for emphasizing the instruction of intonation and rhythm to learners of English. In one embodiment, the approach involves converting speech features into musical commands in the Musical Instrument Digital Interface (MIDI) framework. However, the present invention is not limited to employing the MIDI protocol for representing the intonation, rhythm, and/or other prosodic aspects of human speech.

Other protocols, where available, may be employed, and all such variations are intended to be included within the scope of the present invention.

To assess the quality of the resulting musical signal information, we also report results of experiments in perception and production designed to determine (1) the ability of the musical signal version to capture the characteristic intonation and rhythm of the original speech; and (2) the ability of language learners to imitate what is encoded in the musical signals, and how well can they perform when imitating those same elements in natural speech. Our data indicate that the musically resynthesized audio samples capture suprasegmental characteristics, and that native speakers can imitate the suprasegmental aspects of the synthetic prompts.

Delexicalization of Speech:

Delexicalizing speech is the process of removing the words in a speech signal while preserving suprasegmental elements (and perhaps others). Past approaches have ranged from simply low-pass filtering the speech to randomly re-splicing the speech signal, to nonsensical phoneme replacement in a sophisticated speech synthesizer, or modeling of the vocal tract and voice source transfer functions, and then resynthesizing through a neutral vowel sound.

Changing the human voice into a form of musical signal can also be implemented. The Vocoder is probably the earliest and best-known way of converting speech to a musical signal, without necessarily delexicalizing the speech. Operation of the Vocoder involves deriving a set of speech envelopes by band-pass filtering the voice at multiple frequencies, and then using those envelopes to shape the amplitude of a synthetic musical sound over those same frequency bands. However, the above-listed approaches have not been applied to second-language instruction.

Embodiments of Second-Language Instruction

The natural speech used for resynthesis in this study included text from prompts taken from the Rosetta Stone® Version 3 product for American English. One hundred prompts of varying lengths (anywhere from 2 to 13 syllables) were spoken by three different populations:

(1). Professional voicers;
(2) Non-professional Native English speakers; and
(3) Intermediate-level Japanese learners of English.

Recordings of population (1) are the actual audio used in the product, and as such the recordings were processed to minimize noise and dynamic range. The recordings included recordings from two male speakers and two female speakers. The data for populations (2) and (3) were captured as parroting exercises, spoken in response to (and in imitation of) the population (1) recordings in both natural and resynthesized form. The native English speakers consisted of four males and two females, while the Japanese learners included forty-four males and fifty-one females. The exact amounts of these data used in the perception and production tests is shown below.

Musical Resynthesis of Speech:

In this section we describe step-by-step how we musically resynthesized the speech used in this study. The process involved first automatically segmenting the speech into syllables and extracting the relevant features (Section 4.1), then converting those features and segmentation times into a MIDI signal representation (Section 4.2), and finally generating musical audio from the MIDI encoding of the speech (Section 4.3).

Segmentation and Feature Extraction

In this embodiment, the first step in the musical resynthesis process is to align the text to the speech using Viterbi decoding with a speech recognition system.

The segmentation process provides both word-level and phoneme-level alignments of the speech data, and this decoded sequence of phonemes is then consolidated into syllables based on each word's expected syllabification according to a pronunciation dictionary.

Herein, the syllable is considered to be the fundamental musical unit of English, with each syllable corresponding to exactly one musical note in the final resynthesized audio (i.e. the prosodic signal derived from the uttered speech). Aside from syllable segmentation times, the only speech features used in this resynthesis were fundamental frequency (f0) and Root Mean Square (RMS) energy, calculated at 10 millisecond (ms) intervals. The f0 contours for all utterances were estimated using an autocorrelation-based maximum a posteriori method similar to the one presented in J. Droppo and A. Acero, "Maximum a posteriori pitch tracking," in *Proc. of ICSLP*, 1998. To account for possible estimation errors, the f0 contour was smoothed using a five-point moving-window median filter.

Converting to Musically Encoded Data Such as MIDI

The MIDI format is a set of encoded commands that operate on a sequence of musical notes. Commands available within MIDI include changing the note's pitch, turning a note on or off at specified times, pitch bend (glissando) during a note, and changes in volume dynamics, among many others. In MIDI synthesis, these commands are realized by way of time-domain processing of audio samples of an arbitrary instrument sound.

To convert our features and segmentation times to MIDI signals, we first decided that each MIDI note's onset and offset should follow that of each syllable, segmented as described above. Fluctuations in intonation within a syllable would be represented as dynamic changes in the MIDI pitch bend command over that note. Within each MIDI note, the initialized pitch (the center of any possible pitch bends up or down) was taken as the mean f0 (frequency) over that syllable. The variations in volume over each MIDI note would also follow those of the speech, changing at 10 msec intervals. The notes were first encoded in the Adagio file format, a human-readable text representation of MIDI that can then be converted into a binary MIDI file using the program "Nyquist." Both file types consist of the commands alone, without a specified instrument voice or audio. The foregoing occurs before the actual synthesis happens.

The MIDI standard is designed for use with digital instruments that are tuned to the standard Western 12-tone equal-tempered scale—hence, every note in that scale is represented as a MIDI integer in a linear sequence of MIDI integers. MIDI volume and pitch bend commands are represented similarly, but the human ear perceives frequency and amplitude non-linearly. For these reasons, a fair amount of mathematical conversion was employed so that the MIDI commands would accurately match the frequency and amplitude of the original speech. These conversion equations are given below—in all of them, non-integer results are rounded to the nearest integer, and the index "n" represents time in 10 msec frames.

Frequencies estimated in Hertz were converted to MIDI pitch note numbers using the following equation:

$$P_{MIDI} = 12 * \log_2(f_{Hz\text{-}mean}/440) + 69 \qquad \text{Eq. (1)}$$

where $f_{Hz\text{-}mean}$ is the mean frequency over the syllable. The use of the logarithmic expression $\log_2$ in Equation (1) is included to account for the human ear's nonlinear perception of musical harmony in octaves (an octave is a musical interval spanning a frequency multiple of two (2)). The factor 12 is included because of the 12 equal semitones that divide an octave in Western music. And the note A at 440 Hz corresponds to MIDI note number 69, simply by definition of the MIDI standard.

Similarly, the MIDI pitch bend command is defined as an integer between 0 and 255. Within an arbitrarily defined range, 128 would be the un-bent MIDI note at its initialized value, and 0 and 255 would be the lower and upper ends of the pitch bend range, respectively. If we define the bend range as ±1 octave, then the pitch bend integer at time n is calculated as:

$$P\text{bend}(n)=[(\log(f_{Hz}(n)/f_{Hz\text{-}mean}/\log(2))+1]*255/2 \quad \text{Eq (2)}$$

where $f_{Hz\text{-}mean}$ is the mean frequency over the syllable (the center frequency to which the note is initialized), and the log(2) accounts for the pitch bend range of ±1 octave (a factor of 2 above or below the center frequency). Any pitch bend outside of that range was artificially ceilinged or floored, but it was very rare for any speaker's intonation to sweep over more than two octaves in a single syllable.

Finally, similar to the dimensionless decibel unit that maps the ear's nonlinear perception of amplitude to a linear scale, MIDI volume commands are represented linearly as an integer between 0 and 127 with respect to the maximum amplitude in the signal. If Emax is the maximum RMS energy in the utterance, then the sequence of RMS energy estimates are first converted to dB according to equation (3):

$$E_{dB}(n)=20*\log_{10}(E_{max}/E(n)) \quad \text{Eq. (3)}$$

and then the dB scale is normalized to MIDI integers with respect to $E_{dBmin}$, the minimum dB value in the utterance:

$$E_{MIDI}(n)=126*(1-E_{dB}(n)/E_{dB})+1 \quad \text{Eq. (4)}$$

Note that this actually results in normalization in the range 1 to 127, since a volume command of 0 is equivalent to turning the MIDI note off entirely.

Musical Sound Generation

Once the binary MIDI files are created, musical audio synthesis is very straightforward. We used the Timidity++ software synthesizer to generate WAV format audio files at CD quality. The default MIDI reverb setting was disabled. MIDI synthesis preferably uses a sound font—a file format consisting of a pre-recorded instrument sample (or collection of samples) that can be modified in the time-domain to follow the MIDI synthesis commands. The sound font used in this study, "Campbell's Trombone," is freely available online. This sound font was chosen because of its naturalness, and its close resemblance to the trombone voice of the adult voice used in the Charlie Brown cartoon series.

Perception and Production Tests

As mentioned in Section 1, to evaluate the quality and pedagogical implications of this resynthesized speech, we attempted to answer two questions:
1. Does the musically resynthesized version capture the characteristic intonation and rhythm of the original speech?
2. Can speakers imitate suprasegmental information encoded in musical stimuli, and how does their performance compare when imitating natural speech?

To answering the first question, we conducted a perceptual test to see if native English-speaking listeners could distinguish native from normative stimuli, after resynthesis and removal of lexical content. This test is described below. The second question we addressed through a parroting production exercise in which speakers were asked to imitate both natural and synthetic stimuli—the accuracy of these imitations was then scored automatically, using the original speech features from the stimuli as templates. This test is described below.

Perceptual Study

Ideally, with natural speech, native speakers of English should be able to tell another native speaker from an intermediate-level Japanese learner of English with 100% accuracy. A multiplicity of cues—phoneme quality, intonation, rhythm, fluency, rate of speech, voice quality, etc.—would give away the speakers' respective types. If the musically resynthesized speech in this study is to have any pedagogical value for foreign language teaching, it must also capture many of the cues that characterize native pronunciation in the suprasegmental domain.

Six native English-speaking test subjects were given pairs of resynthesized speech files—one from a native speaker and the other from a Japanese learner—and were then asked to decide which was which. In each of the 94 pairs, both speakers were reading the same text. The speaker populations were the non-professional native and learner speakers, and the choice of speakers for each pair was random and evenly distributed. Since the phonetic information was removed in the musically resynthesized versions, the listening subjects were also given the target text for each pair of files, as a reference in order judge the nativeness of each audio file.

Our hypothesis was that native listeners should be able to tell which of the files in each pair came from a native speaker, at better than chance levels, and that this would indicate that the musical resynthesis procedure discussed above did indeed capture the trademark suprasegmental aspects of native speech. We were also interested in the dependent variable of utterance length. That is, we sought to determine whether short utterances be more difficult to judge, because of a lack of linguistic cues for nativeness. Listener accuracy in this perceptual experiment is reported in Table 1.

TABLE 1

Table 1: Percent accuracy in the perceptual test to distinguish native from normative examples in resynthesized speech. Chance is 50%.

| Listener | All | ≤4 syllables | ≥5 syllables |
|---|---|---|---|
| 1 | 62.8 | 66.7 | 61.4 |
| 2 | 63.8 | 62.5 | 64.3 |
| 3 | 68.1 | 62.5 | 70.0 |
| 4 | 71.3 | 75.0 | 70.0 |
| 5 | 77.7 | 58.3 | 84.3 |
| 6 | 71.3 | 66.7 | 72.9 |

The test subjects were able to tell the native speech from the normative speech at significantly better than chance levels (chance is 50% in this case). Using a test for difference in binomial proportions, overall results were significantly higher than chance with p≤0:08 or better. This demonstrates that the resynthesis procedure described here captured linguistic cues of native speech.

Additionally, we found that only one of the six listeners (#5 in Table 1) performed significantly better when judging longer utterances rather than shorter ones. A short utterance was defined as having 4 syllables or less—there were 24 of these in the corpus (e.g. "Yes, I'm ready" or "Hello."). Our conclusion is that even in these short resynthesized utterances, relevant information about a speaker's degree of nativeness is encoded in the various utterances.

Production Exercise

Our hope in this study is that the musically resynthesized audio would be adequate to teach listeners to imitate the intonation and rhythm of the original speech, and that the accuracy in this imitation would be comparable to (or possibly better than) that of natural speech stimuli. In the absence of phonetic information, speakers preferably focus on learning the suprasegmental aspects of the stimulus audio. To test this hypothesis, we asked six native English speakers to imitate the intonation and rhythm of 96 prompts, played for them both as natural speech and, later, as musically resynthesized audio, along with the target text. The synthetic stimuli imitation task was conducted more than six months after the natural stimuli task, so it is not very likely that the subjects remembered the natural stimuli.

One issue is how to define intonation or rhythm imitation accuracy. We have investigated novel measures for scoring parroted learner speech against a specific native stimulus template. The intonation score involved a phoneme-level warping of the template f0 contour to that of the test utterance, and then calculation of the coefficient of correlation between the two full contours. The novel rhythm score, called the Pairwise Variability Error (PVE), was defined in Equation (5) below as:

$$PVE = \frac{\sum_{i=2}^{N} \sum_{m=1}^{min(M,i-1)} |(s_i - s_{i-m}) - (r_i - r_{i-m})|}{\sum_{i=2}^{N} \sum_{m=1}^{min(M,i-1)} |s_i - s_{i-m}| + |r_i - r_{i-m}|}. \quad \text{(Eq. 5)}$$

Essentially Equation (5) sums up the "difference of differences" between durations of pairs of syllables in the student and reference sequences ($\{s_1; s_2; \ldots; s_N\}$ and $\{r_1; r_2; \ldots; r_N\}$, respectively), and then normalizes by the total absolute difference in duration.

If the student and reference durations are nearly equal, this score tends toward zero. As difference in durations approaches infinity, this score approaches 1. The m variable is the rhythmic context–an integer $m \geq 1$—which allows for comparisons between distant syllables (i.e. M is the maximum distance, in syllables, considered for comparison). Unlike another commonly-used rhythm measure, the Pairwise Variability Index (PVI), the PVE accounts for interactions between pairs of syllables that are not adjacent in the utterance. A linear regression classifier that combined only these intonation and rhythm scores was able to distinguish native imitation from normative imitation with 80.0% accuracy. The value M=3 in Eqn. 5 was found to be optimal for that task, so that is what was used here.

Table 2 reports mean automatic scores on the imitated speech collected in this study. The features derived from natural speech (outlined in Section 4.1) were used as a template for scoring the imitation both from natural and synthetic stimuli. We see that, when imitating the synthetic prompts, all speakers could achieve statistically significant correlation with the intonation contours of the stimuli intonation contour, and the rhythm scores were in the range expected for natural speech imitation. It appears that all speakers can imitate the intonation and rhythm of natural speech at around the same levels of accuracy.

However, when imitating synthetic speech, the intonation score drops significantly for all of the speakers. There is a significant difference in speaker-level correlation coefficients with $p \leq 0:08$ or better. There is also a slight decline in the rhythm score with the synthetic stimuli, but it is not as dramatic as for intonation. Using a one-tailed t-test, only four of the six speakers were found to have significantly lower mean rhythm scores when imitating the synthetic stimuli, at the 95% confidence level. These lower scores can be explained by listener unfamiliarity with the synthesized prompts. Most subjects expressed difficulty in parsing the musical speech (i.e. matching syllables in the text with the corresponding musical notes), and as a result many of the imitations in response to the musical speech sounded unexpectedly disfluent.

In a language instruction scenario, the syllable-to-note correspondence is preferably indicated visually perhaps graphically, in follow-the-bouncing-ball style or something similar. These results suggest that synthetic speech will preferably be used in conjunction natural speech teaching techniques, to emphasize suprasegmental characteristics of speech.

The above test was only done with native speakers—the results with Japanese learners is still open to conjecture. Another limitation of this test is that all the scores are automatically generated—there was no subjective listener evaluation of the quality of the imitation.

Herein, we present a new way to musically resynthesize speech, to eliminate phonetic elements and generate content tailored for teaching intonation and rhythm to second-language learners. A test of perception showed that this resynthesis process was capturing the telltale characteristics of native English, since native listeners were able to tell native examples from normative examples at better than chance levels. A further test of imitation showed that native speakers could imitate the synthetic speech with significant correlation in intonation and relatively high rhythm scores, but that they could not imitate the synthetic stimuli as accurately as they could imitate the natural speech from which it was generated.

TABLE 2

Table 2: Mean automatic intonation and rhythm scores (as defined in Section 5.2) for imitation of both natural and synthetic stimuli.

| Speaker # | Intonation | | Rhythm | |
| --- | --- | --- | --- | --- |
| | Synthetic | Natural | Synthetic | Natural |
| 1 | 0.432 | 0.708 | 0.727 | 0.766 |
| 2 | 0.518 | 0.788 | 0.676 | 0.770 |
| 3 | 0.422 | 0.742 | 0.720 | 0.759 |
| 4 | 0.602 | 0.770 | 0.735 | 0.745 |
| 5 | 0.644 | 0.773 | 0.759 | 0.773 |
| 6 | 0.478 | 0.744 | 0.706 | 0.774 |

Further improvements in the quality of the resynthesized audio may be obtained from additional robustness in any of the components that contribute to it, such as: the pitch tracker, the syllable decoder, the conversion of speech features to MIDI commands, and/or even the choice of sound font. We also found that the resynthesized speech sounded most natural when derived from natural speech that had not been processed with dynamic compression, which can tend to flatten the natural rises and falls in energy at syllable onsets and offsets. Preserving these natural energy contours makes the musically resynthesized speech sound more speech-like.

Figure 5:
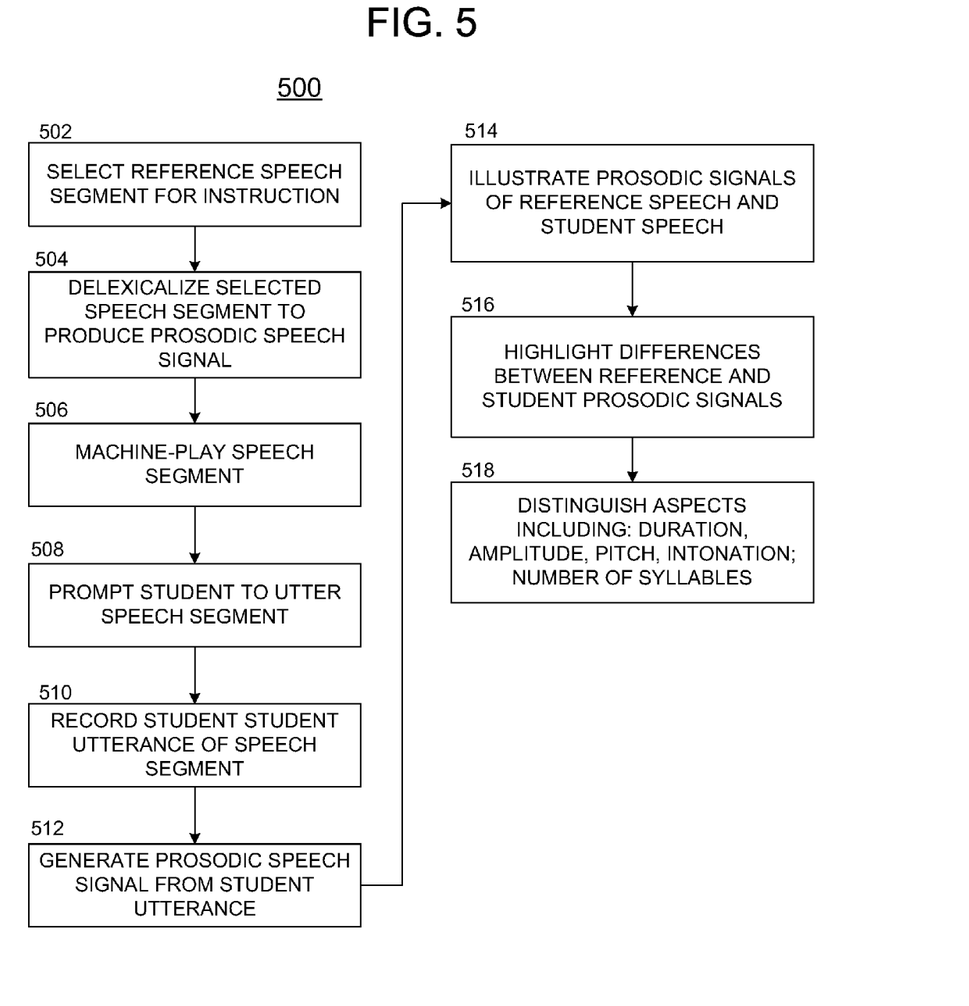
FIG. 5 is a block diagram of a method for comparing student utterance to reference utterances in accordance with an embodiment of the present invention.

FIG. 5 is a block diagram of a method 500 for comparing student utterance to reference utterances in accordance with an embodiment of the present invention. At step 502, the method selects a speech segment for aiding a student with the prosodic aspects of speech. At step 504, the selected speech segment is delexicalized to produce a prosodic speech signal, which is preferably stored in a suitable computer memory for later use. The prosodic signal produced by delexicalizing the speech segment may be a MIDI signal. At step 506, the language instruction system 100 plays the speech segment for student 102.

At step 508, instruction system 100 prompts student 102 to utter the selected speech segment. Prompting may be conducted by way of an audio prompt and/or a visual text prompt. At step 510, the student utterance of the speech segment may be digitized and recorded. Alternatively, the student utterance could be delexicalized into a prosodic signal in real-time, and the resulting prosodic signal could be stored in a suitable computer memory. At step 512, the recording of the student utterance is delexicalized so as to generate a prosodic signal from the student utterance, and the resulting signal data is preferably stored in memory 406.

At step 514, language instruction system 100 preferably visually illustrates both the reference prosodic signal (generated in step 504) and the student prosodic signal (generated in step 512) to aid in showing the differences in various aspects of speech between the two signals. To aid in the instruction process, computer 400 may employ display 420 to highlight (step 516) the most salient differences between the reference and student speech signals. The aspects of the prosodic signals to be distinguished (step 518) may include, but are not limited to: duration (of individual syllables and/or of the speech segment as a whole), amplitude, pitch, pitch variation throughout portions of the speech segment; intonation; and the total number of syllables used.

Figure 6:
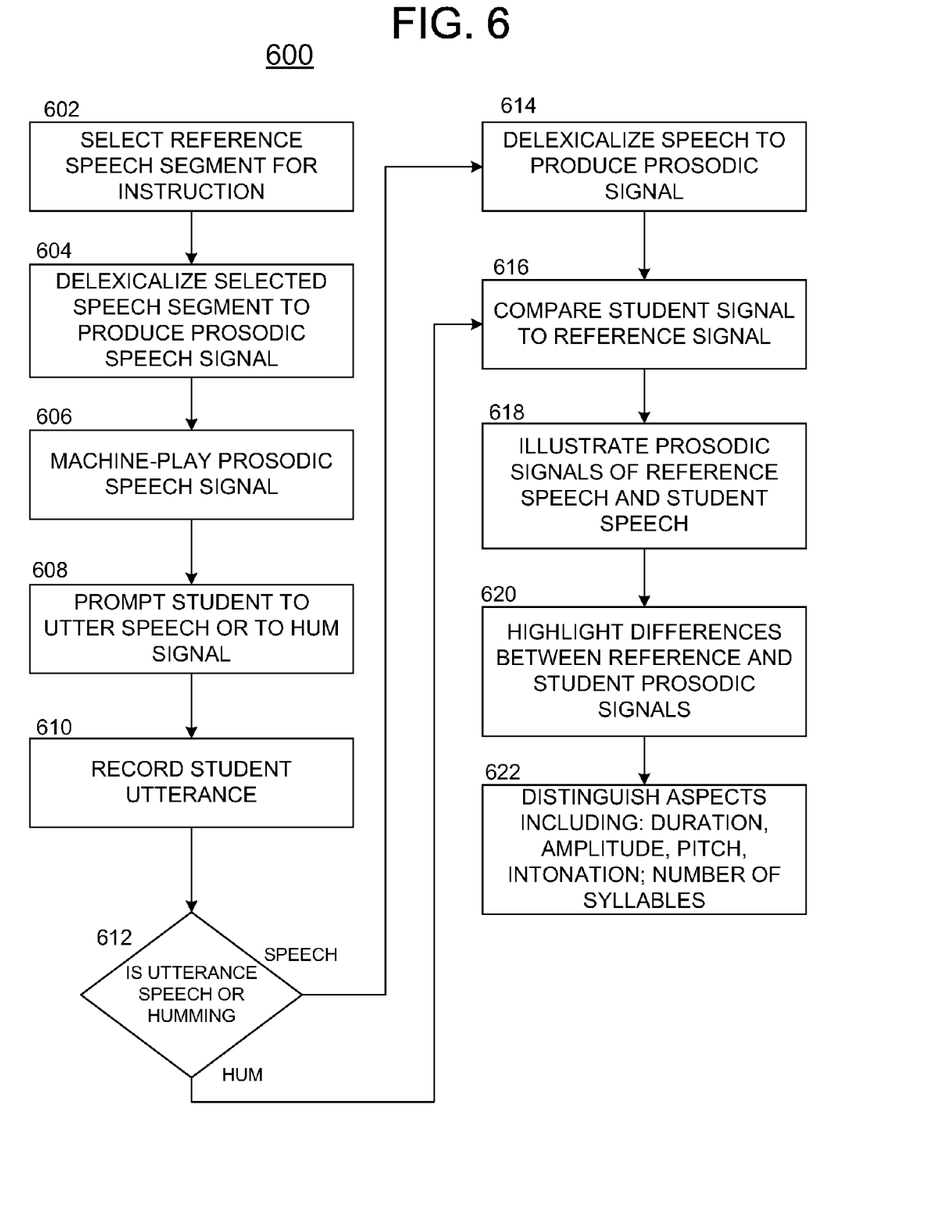
FIG. 6 is a block diagram of a method for comparing a student utterance in the form of hummed syllables to a reference utterance in accordance with an embodiment of the present invention.

FIG. 6 is a block diagram of a method 600 for comparing a student utterance in the form of hummed syllables to a reference utterance in accordance with an embodiment of the present invention. At step 602, a reference speech segment is selected for instructional purposes. Thereafter, the selected speech segment is delexicalized (step 604) to produce a prosodic speech signal from the speech segment. The delexicalization of step 604 may include converting the suprasegmental aspects of the spoken version of the selected speech segment into MIDI code. However, the present invention is not limited to the use of MIDI codes as a mechanism for encoding the prosodic aspects of speech.

At step 606, the prosodic speech signal, generated in step 604, is played by the language instruction system 100 for student 102. Instruction system 100 then preferably prompts student 102 to utter speech from which the prosodic signal originated, or to hum or speech the prosodic signal played by instruction system 100. At step 610, the student preferably speaks in response to the prompt and the student utterance is recorded by the language instruction system 100. At step 612, system 100 determines whether the student utterance is speech or merely a humming of a prosodic component of normal speech.

At step 612, system 100 determines whether the student utterance is speech or merely humming. If the student utterance is speech, the system 100 delexicalizes (614) the student speech to produce a student prosodic signal. If the student utterance was humming (that is, substantially completely prosodic) the system 100 compares (616) the student prosodic utterance (which may also be referred to as a prosodic signal) to the reference prosodic signal.

At step 618, language instruction system 100 preferably visually illustrates both the reference prosodic signal (generated in step 604) and the student prosodic signal (either recorded in step 610 or generated in step 614) to aid in showing the differences in various aspects of speech between the two signals. To aid in the instruction process, computer 400 may employ display 420 to highlight (step 620) the most salient differences between the reference and student speech signals. The aspects of the prosodic signals to be distinguished (step 622) may include, but are not limited to: duration (of individual syllables and/or of the speech segment as a whole), amplitude, pitch, pitch variation throughout portions of the speech segment; intonation; and the total number of syllables used.

Figure 7:
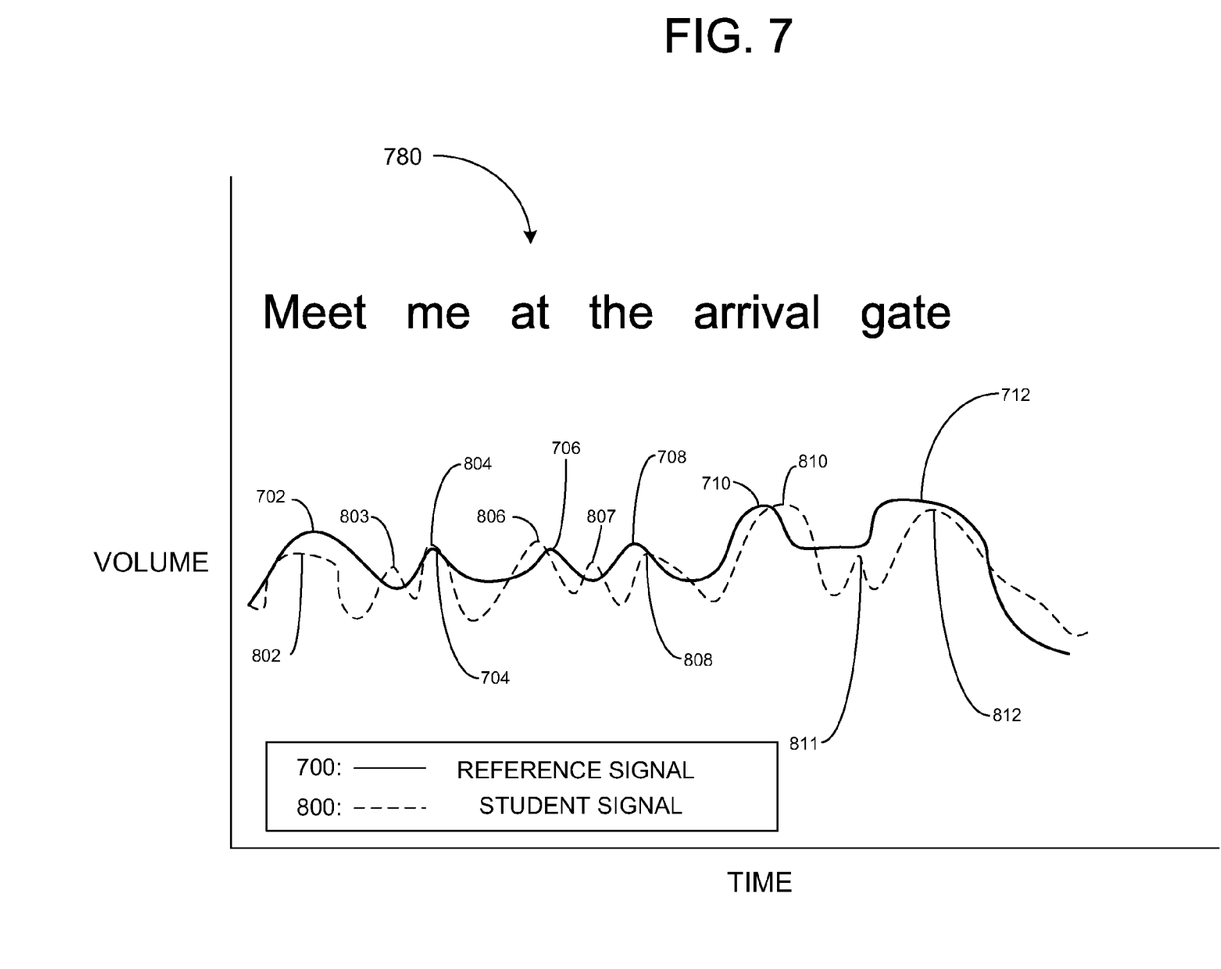
FIG. 7 is a graph of volume (amplitude) versus time for reference and student utterances of a common text sequence.

FIG. 7 is a graph of volume (amplitude) versus time for reference and student utterances of a common text sequence. FIG. 7 shows the volume-time graphs of an exemplary reference prosodic signal indicated by curve 700 and an exemplary student prosodic signal indicated by curve 800. Each prosodic signal corresponds to the prosodic component of the utterance of the speech segment 780 shown above the curves "Meet me at the arrival gate". The text employed for this discussion is exemplary, and it will be appreciated by those having ordinary skill in the art that any text sequence in any language could be employed for the purpose of comparing reference and student prosodic signals.

While the two prosodic signals may differ in many respects (that is, with respect to many prosodic characteristics of speech), differences in amplitude of speech and in the number syllables in the speech segment 780 are the characteristics displayed most prominently in the graph of FIG. 7. We start from the observation that people having Japanese, Korean, and possibly other non-English native tongues tend to insert syllables where none would normally be pronounced by native speakers of English (particularly between two consonant sounds). This is intended to illustrate but one of many possible differences in prosody between native speakers of English and students of English starting from various non-English languages.

For the sake of the following discussion, we divide the prosodic signal curves 700, 800 into two basic components: (1) the major points of emphasis in speech segment 780 and (2) the additional syllables introduced in student prosodic signal 800. We address these two components in turn.

Directing attention to speech segment 780 and prosodic signal 700, we see that a point of emphasis in speech segment 780 corresponds to an amplitude peak in prosodic signal 700, as would be expected. Thus, In the following, the prosodic aspects of the reference and student prosodic signals are discussed with reference to corresponding portions of speech segment 780. As would be expected, the reference signal 700 displays amplitude peaks and the points where emphasis occurs within speech segment 780. Thus, signal peaks 702, 704, 706, 708, and 712 occur near the middle of the sole syllables of the words "meet," "me," "at," "the," and "gate," respectively. Similarly, the signal peak 710 occurs within the second syllable of the word "arrival". Prosodic signal 800 shows amplitude peaks at locations substantially corresponding to those shown for signal 700, as would be expected. Thus, signal peaks 802, 804, 806, 808, 810, and 812 occur at points in time quite close to corresponding points along signal 700 denoted with reference numerals having the same last two digits but having a "7" as a leading digit. We direct attention next to the "additional syllables" included within prosodic signal We turn now to the presence in signal 800 of extraneous syllables occurring between pairs of adjacent consonants. Specifically, such extraneous syllables are pointed to by reference numerals 803, 807, and 811. The pertinent syllables may thought of as being generic vowel sounds, such as "uh" occurring between consonants. Thus, whereas a native speaker would speak the words "meet me" as written, students having certain native languages may speak a sequence of sounds corresponding roughly to "meet uh me" due to speech patterns customary in the native language of the student.

The illustration of extraneous syllables 803, 807, and 811 as shown in the graph of FIG. 7 may be employed to alert the student 102 to his/her pronunciation of these syllables and guide the student 102 toward gradually diminishing and ultimately eliminating such syllables from the student's speech.

For the sake of ease of illustration only one prosodic characteristic—amplitude—is plotted against time in FIG. 7. However, it will be appreciated that the principles employed in the illustration of FIG. 7 may also be employed to illustrate other prosodic characteristics such as, but not limited to: a difference in rhythm; a difference in duration in units of time of a syllable and/or of an entire speech segment; a difference in pitch between various syllables; and/or a difference in intonation.

Figure 8:
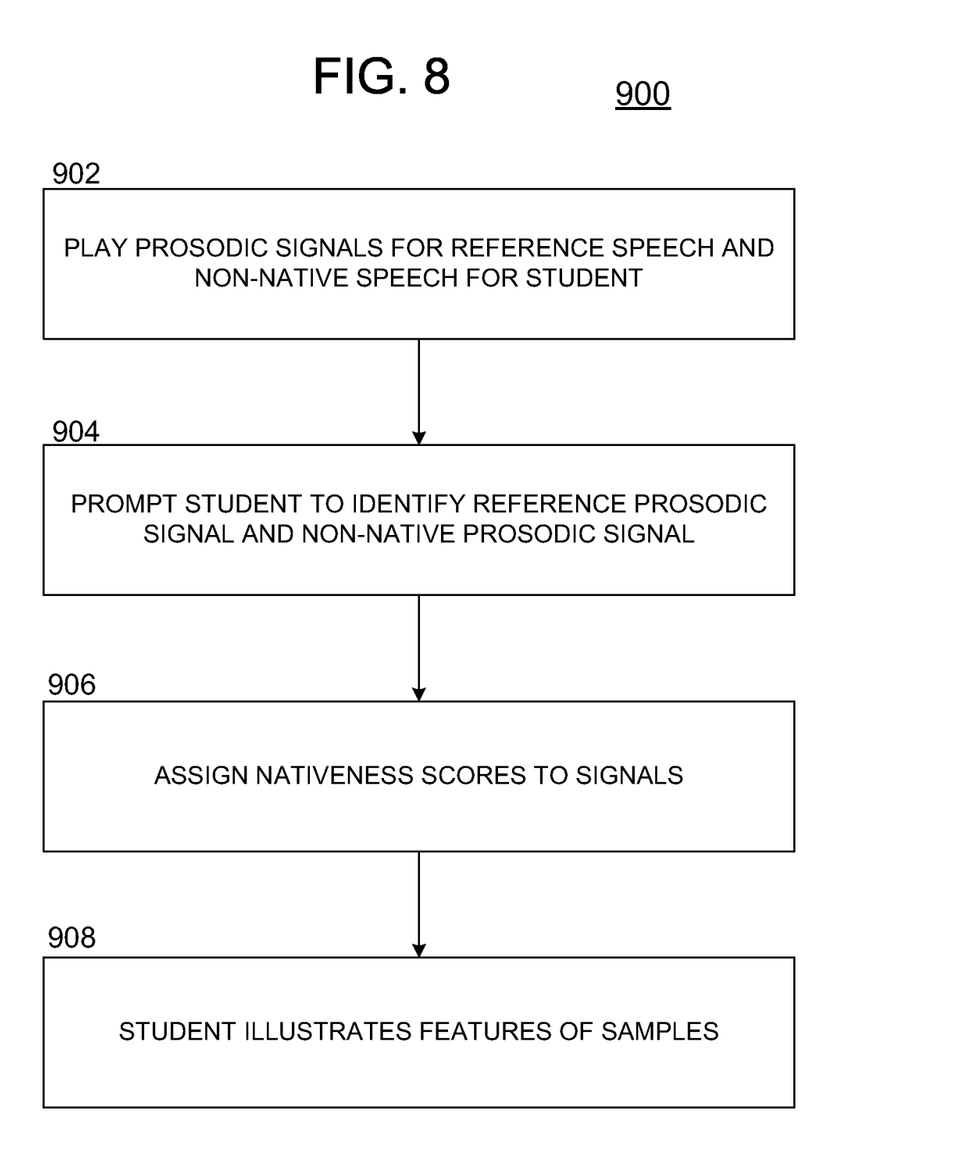
FIG. 8 is a block diagram of a method for having a student compare native and non-native utterances in accordance with an embodiment of the present invention.

FIG. 8 is a block diagram 900 of a method for having a student compare native and non-native utterances in accordance with an embodiment of the present invention. In this embodiment, a student is invited to evaluate a prosodic component of reference speech (i.e. native speech) and a prosodic component of non-native speech, assign scores to the respective samples, and to illustrate various features of the respective speech samples.

At step 902, the system 100 plays prosodic signals arising from (a) a reference speech sample; and (b) a non-native speech sample for the student 102. At step 904, the system 100 prompts student 102 to identify the reference prosodic signal and non-native prosodic signal. At step 906, student 102 preferably assigns scores to the respective prosodic samples based on the degree of nativeness of each sample. At step 908, student 102 illustrates one or more prosodic characteristics of the respective samples, using a visual tool of some sort.

For example, student 102 could be prompted to draw size-varying circles (using one circle for each syllable) in accordance with the student's 102 perception of the intonation or rhythm (and/or other prosodic characteristic of speech) of the respective prosodic signals. System 100 may then evaluate student 102 based on the degree of correspondence of the student's 102 classification of the speech samples to a classification of the speech samples stored within computer 400 of language instruction system 100.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

A student then is presented with a non-lexicalized version of a word or phrase, and asked to repeat that phrase, preferably using a lexicalized version. The system may then convert the student's utterance to a non-lexicalized version and compare that to the lexicalized version presented to the student to determine how close the students utterance is to the way the phrase should be uttered. Future lessons may then be adjusted to provide practice so the student not only knows the proper words in the target language, but the proper intonation and other properties.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    delexicalizing a speech segment to generate a first prosodic speech signal;
    encoding the first prosodic speech signal to generate a musically encoded prosodic speech signal;
    storing data indicative of the musically encoded prosodic speech signal in a computer memory;
    audibly playing the musically encoded prosodic speech signal to a language student;
    prompting, in response to the audibly playing, the student to recite the speech segment from which the musically encoded prosodic speech signal originated;
    recording audible speech uttered by the student in response to the prompt;
    delexicalizing the audible speech to generate a second prosodic speech signal;
    calculating at least one error signal based on a difference between:
        a difference between a duration of a first syllable in the first prosodic speech signal and a duration of a second syllable in the first prosodic speech signal, the first syllable in the first prosodic speech signal being non-adjacent to the second syllable in the first prosodic speech signal; and
        a difference between a duration of a first syllable in the second prosodic speech signal and a duration of a second syllable in the second prosodic speech signal, the first syllable in the second prosodic speech signal being non-adjacent to the second syllable in the second prosodic speech signal.

2. The method of claim 1, further comprising:
    determining prosodic characteristics of the first prosodic speech signal and the second prosodic speech signal, the calculating the at least one error signal being based on the prosodic characteristics of the first prosodic speech signal and the second prosodic speech signal.

3. The method of claim 1, further comprising:
    determining prosodic characteristics of the first prosodic speech signal and the second prosodic speech signal, the calculating the at least one error signal being based on the prosodic characteristics of the first prosodic speech signal and the second prosodic speech signal, the prosodic characteristics including rhythm, the prosodic characteristics further including at least one of prosody; duration in time; a total number of syllables; or a pitch level of at least one syllable.

4. The method of claim 1, wherein
    the at least one error signal is further based on at least one of a difference in prosody between the first prosodic speech signal and the second prosodic speech signal; a difference in a total number of syllables between the first prosodic speech signal and the second prosodic speech signal; a difference in duration in units of time between the first prosodic speech signal and the second prosodic speech signal; a difference in pitch between respective syllables between the first prosodic speech signal and the second prosodic speech signal; or a difference in intonation between the first prosodic speech signal and the second prosodic speech signal.

5. The method of claim 1, wherein the encoding includes implementing a musical instrument digital interface (MIDI) framework.

6. The method of claim 1, wherein the encoding includes converting a frequency of the first prosodic speech signal to a musical instrument digital interface (MIDI) pitch note number.

7. The method of claim 1, wherein the calculating the at least one error signal is further based on a sum of the difference between:
- the difference between the duration of the first syllable in the first prosodic speech signal and the duration of the second syllable in the first prosodic speech signal, the first syllable in the first prosodic speech signal being non-adjacent to the second syllable in the first prosodic speech signal; and
- the difference between the duration of the first syllable in the second prosodic speech signal and the duration of the second syllable in the second prosodic speech signal, the first syllable in the second prosodic speech signal being non-adjacent to the second syllable in the second prosodic speech signal.

8. The method of claim 7, wherein the calculating the at least one error signal is further based on a normalization of the sum of the difference.

9. A method, comprising:
- audibly presenting a non-lexicalized musically encoded phrase in a target language to a student;
- receiving, at a computer, a lexicalized version of the non-lexicalized musically encoded phrase in the target language from the student;
- comparing, at the computer, non-lexical properties of the non-lexicalized musically encoded phrase with non-lexical properties of the lexicalized version of the non-lexicalized musically encoded phrase to calculate at least one error signal based on a difference between:
  - a difference between a duration of a first syllable in the non-lexicalized musically encoded phrase and a duration of a second syllable in the non-lexicalized musically encoded phrase, the first syllable in the non-lexicalized musically encoded phrase being non-adjacent to the second syllable in the non-lexicalized musically encoded phrase; and
  - a difference between a duration of a first syllable in the lexicalized version of the non-lexicalized musically encoded phrase and a duration of a second syllable in the lexicalized version of the non-lexicalized musically encoded phrase, the first syllable in the lexicalized version of the non-lexicalized musically encoded phrase being non-adjacent to the second syllable in the lexicalized version of the non-lexicalized musically encoded phrase; and
- adjusting a future lesson for the student based upon the error signal.

10. The method of claim 9, wherein the non-lexical properties of the non-lexicalized musically encoded phrase and the lexicalized version of the non-lexicalized musically encoded phrase are visually presented to a user.

11. The method of claim 9, wherein the at least one error signal is based on a difference in rhythm between the non-lexicalized musically encoded phrase and the lexicalized version of the non-lexicalized musically encoded phrase, the at least one error signal further based on at least one of a difference in prosody between the non-lexicalized musically encoded phrase and the lexicalized version of the non-lexicalized musically encoded phrase; a difference in the total number of syllables between the non-lexicalized musically encoded phrase and the lexicalized version of the non-lexicalized musically encoded phrase; a difference in duration in units of time between the non-lexicalized musically encoded phrase and the lexicalized version of the non-lexicalized musically encoded phrase; a difference in pitch between respective ones of the syllables between the non-lexicalized musically encoded phrase and the lexicalized version of the non-lexicalized musically encoded phrase; or a difference in intonation between the non-lexicalized musically encoded phrase and the lexicalized version of the non-lexicalized musically encoded phrase.

12. The method of claim 9, wherein the non-lexical properties of the non-lexicalized musically encoded phrase and the non-lexical properties of the lexicalized version of the non-lexicalized musically encoded phrase include rhythm, and further include at least one of prosody; duration in time; a total number of syllables; or a pitch level of at least one syllable.

13. The method of claim 9, wherein the at least one error signal further based on a sum of the difference between:
- the difference between the duration of the first syllable in the non-lexicalized musically encoded phrase and the duration of the second syllable in the non-lexicalized musically encoded phrase, the first syllable in the non-lexicalized musically encoded phrase being non-adjacent to the second syllable in the non-lexicalized musically encoded phrase; and
- the difference between the duration of the first syllable in the lexicalized version of the non-lexicalized musically encoded phrase and the duration of the second syllable in the lexicalized version of the non-lexicalized musically encoded phrase, the first syllable in the lexicalized version of the non-lexicalized musically encoded phrase being non-adjacent to the second syllable in the lexicalized version of the non-lexicalized musically encoded phrase.

14. A non-transitory processor-readable medium storing code representing instructions to be executed by a processor, the code comprising code to cause the processor to:
- encode a first prosodic speech signal to generate a musically encoded first prosodic speech signal by mapping each syllable of the first prosodic speech signal to a musical note;
- store the musically encoded first prosodic speech signal;
- audibly play the musically encoded first prosodic speech signal to a language student;
- prompt the student to recite the speech segment from which the musically encoded first prosodic speech signal originated;
- record an utterance from the language student in response to the prompt;
- delexicalize the utterance to generate a second prosodic speech signal; and
- calculate at least one error signal based on a difference between:
  - a difference between a duration of a first syllable in the first prosodic speech signal and a duration of a second syllable in the first prosodic speech signal, the first syllable in the first prosodic speech signal being non-adjacent to the second syllable in the first prosodic speech signal; and
  - a difference between a duration of a first syllable in the second prosodic speech signal and a duration of a second syllable in the second prosodic speech signal, the first syllable in the second prosodic speech signal being non-adjacent to the second syllable in the second prosodic speech signal.

15. The non-transitory processor-readable medium of claim 14, further comprising code to cause the processor to:
- determine prosodic characteristics of the first prosodic speech signal and the second prosodic speech signal, the code to cause the processor to calculate includes code to cause the processor to calculate the at least one error signal based on the prosodic characteristics of the first prosodic speech signal and the second prosodic speech signal.

16. The non-transitory processor-readable medium of claim 14, further comprising code to cause the processor to:
    determine prosodic characteristics of the first prosodic speech signal and the second prosodic speech signals, the code to cause the processor to calculate includes code to cause the processor to calculate the at least one error signal based on the prosodic characteristics of the first prosodic speech signal and the second prosodic speech signal, the prosodic characteristics including rhythm, the prosodic characteristics further including at least one of prosody; duration in time; a total number of syllables; or a pitch level of at least one syllable.

17. The non-transitory processor-readable medium of claim 14, wherein
    the at least one error signal is further based on at least one of a difference in prosody between the first prosodic speech signal and the second prosodic speech signal; a difference in a total number of syllables between the first prosodic speech signal and the second prosodic speech signal; a difference in duration in units of time between the first prosodic speech signal and the second prosodic speech signal; a difference in pitch between respective syllables between the first prosodic speech signal and the second prosodic speech signal; or a difference in intonation between the first prosodic speech signal and the second prosodic speech signal.

18. The non-transitory processor-readable medium of claim 14, wherein the musically encoded first prosodic speech signal is encoded in a musical instrument digital interface (MIDI) framework.

19. The non-transitory processor-readable medium of claim 14, wherein the code to cause the processor to encode includes code to cause the processor to encode the first prosodic speech signal at least partially by converting a frequency of the first prosodic speech signal to a musical instrument digital interface (MIDI) pitch note number.

20. The non-transitory processor-readable medium of claim 14, wherein the at least one error signal further based on a sum of the difference between:
    the difference between the duration of the first syllable in the first prosodic speech signal and the duration of the second syllable in the first prosodic speech signal, the first syllable in the first prosodic speech signal being non-adjacent to the second syllable in the first prosodic speech signal; and
    the difference between the duration of the first syllable in the second prosodic speech signal and the duration of the second syllable in the second prosodic speech signal, the first syllable in the second prosodic speech signal being non-adjacent to the second syllable in the second prosodic speech signal.

\* \* \* \* \*